United States Patent
Oohara (10) Patent No.: US 9,912,215 B2
(45) Date of Patent: Mar. 6, 2018

(54) MOTOR CONTROL DEVICE FOR ESTIMATING TEMPERATURE OF WINDINGS, AND METHOD FOR CALCULATING ALLOWABLE DUTY CYCLE TIME FOR MACHINE

(71) Applicant: FANUC CORPORATION, Yamanashi (JP)

(72) Inventor: Taku Oohara, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/189,107

(22) Filed: Jun. 22, 2016

(65) Prior Publication Data
US 2017/0012567 A1     Jan. 12, 2017

(30) Foreign Application Priority Data
Jul. 9, 2015    (JP) ................................ 2015-138006

(51) Int. Cl.
H02K 11/25    (2016.01)
H02P 29/64    (2016.01)

(52) U.S. Cl.
CPC .............. H02K 11/25 (2016.01); H02P 29/64 (2016.02)

(58) Field of Classification Search
CPC ................................ H02K 11/25; H02P 29/64
See application file for complete search history.

(56) References Cited

U.S. PATENT DOCUMENTS

| 2007/0085508 A1* | 4/2007 | Fujitsuna | H02P 6/185 318/712 |
| 2009/0066283 A1* | 3/2009 | Son | H02P 29/64 318/473 |
| 2009/0189561 A1* | 7/2009 | Patel | H02H 7/0852 318/806 |

(Continued)

FOREIGN PATENT DOCUMENTS

| JP | 6149717 A | 3/1986 |
| JP | 200379179 A | 3/2003 |

(Continued)

OTHER PUBLICATIONS

English Abstract and Machine Translation for Japanese Publication No. 2013-070485 A, published Apr. 18, 2013, 22 pgs.

(Continued)

*Primary Examiner* — Shawki S Ismail
*Assistant Examiner* — Muhammad S Islam
(74) *Attorney, Agent, or Firm* — Fredrikson & Byron, P.A.

(57) ABSTRACT

A motor control device according to this invention includes a correction unit which calculates a correction coefficient for correcting the temperature of windings, based on the result of a comparison between a winding estimated temperature rise profile representing the temperature of the windings estimated by a winding temperature estimation unit and a winding actual temperature rise profile representing the temperature of the windings measured by a temperature sensor, when a motor as attached to a machine is rotated at a predetermined rotational speed, to match the winding estimated temperature rise profile with the winding actual temperature rise profile, and corrects a temperature rise estimation arithmetic expression using the correction coefficient.

5 Claims, 5 Drawing Sheets

(56) References Cited

U.S. PATENT DOCUMENTS

| | | | | |
|---|---|---|---|---|
| 2010/0002744 A1* | 1/2010 | Sheahan | ................ | G01K 7/16 |
| | | | | 374/1 |
| 2015/0048772 A1* | 2/2015 | Nagata | .................... | G05B 6/02 |
| | | | | 318/634 |

FOREIGN PATENT DOCUMENTS

| | | | |
|---|---|---|---|
| JP | 201370485 A | 4/2013 | |
| JP | 2014156005 A | 8/2014 | |
| WO | 2013145267 A1 | 10/2013 | |

OTHER PUBLICATIONS

English Abstract and Machine Translation for Japanese Publication No. 2014-156005 A, published Aug. 28, 2014, 17 pgs.
English Abstract and Machine Translation for Japanese Publication No. 2003-079179 A, published Mar. 14, 2003, 26 pgs.
English Abstract and Machine Translation for Japanese Publication No. 61-049717 A, published Mar. 11, 1986, 5 pgs.

* cited by examiner

MOTOR CONTROL DEVICE FOR ESTIMATING TEMPERATURE OF WINDINGS, AND METHOD FOR CALCULATING ALLOWABLE DUTY CYCLE TIME FOR MACHINE

BACKGROUND OF THE INVENTION

1. Field of the Invention

The present invention relates to a motor control device for controlling a motor by estimating the temperature of windings of the motor to prevent burnout of the windings, and a method for calculating an allowable duty cycle time for a machine, which is executed by the motor control device.

2. Description of the Related Art

The winding temperature of a motor increases upon activation of the motor. The winding temperature saturates a certain time after activation of the motor, thereby being maintained at a high temperature (the then obtained temperature will be referred to as a "saturation temperature" hereinafter). When windings having such a saturation temperature continue to be supplied with a current in excess of their heat-resistant temperature, the windings of the motor may be burned out. Even when the temperature of the windings has not saturated, an exceedance of their heat-resistant temperature may burn out the windings of the motor. Therefore, in driving control of the motor, the temperature of the windings is monitored by a temperature sensor. When the monitored winding temperature exceeds a preset temperature, current supply to the windings is stopped to prevent burnout of the windings.

The winding temperature is estimated based on a temperature rise estimation arithmetic expression incorporated in the software of a motor without providing a temperature sensor to the windings to keep the manufacturing cost low, as is conventionally known (see, e.g., Japanese Laid-open Patent Publication No. 2013-070485).

When a machine such as a machine tool or a robot is controlled in driving by a motor, a motor OFF time is set to be after a predetermined motor ON time to keep the winding temperature below a preset motor temperature protection level (to be referred to as an "alarm level" hereinafter).

Based on, e.g., a track record for actual processing by a machine tool or simulation that uses analysis of a processing program, the motor control device obtains in advance a motor ON time and a motor current value corresponding to one-cycle operation of the machine. The motor control device estimates the winding temperature upon one-cycle operation, based on the obtained motor current value. The motor control device further obtains a motor OFF time to be interposed between one-cycle operations of the machine, to keep the winding temperature below an alarm level upon repetitions of one-cycle operation of the machine. The motor control device prevents burnout of the windings by driving the motor in accordance with a combination (to be referred to as an allowable duty cycle time hereinafter) of the motor ON time and the motor OFF time obtained in advance.

However, since the heat capacity varies in each individual structure forming the machine provided with the motor, it is difficult to estimate the winding temperature in consideration of the heat capacity of the machine and, in turn, to accurately calculate an allowable duty cycle time for the machine.

In such a case, the winding temperature is estimated by trial and error while operating a machine as actually equipped with a motor. Therefore, it takes a lot of time and cost to obtain an allowable duty cycle time for the machine.

Since the motor OFF time is controlled in accordance with the allowable duty cycle time for the machine, it is difficult to efficiently operate the machine when the calculated allowable duty cycle time is inaccurate.

SUMMARY OF INVENTION

The present invention provides a motor control device which can estimate the winding temperature in consideration of the heat capacity of a machine, and a method for calculating an allowable duty cycle time for a machine, which is executed by the motor control device.

The present invention in its first aspect provides a motor control device for controlling a motor which actuates a machine. The device includes a winding temperature estimation unit, a temperature sensor, and a correction unit. The winding temperature estimation unit estimates the temperature of a winding of the motor in accordance with a temperature rise estimation arithmetic expression for calculating the temperature of the winding using a current value applied to the winding. The temperature sensor is mounted on the winding. The correction unit calculates a correction coefficient for correcting the temperature of the winding, based on the result of a comparison between a winding estimated temperature rise profile representing the temperature of the winding estimated by the winding temperature estimation unit and a winding actual temperature rise profile representing the temperature of the winding measured by the temperature sensor, when the motor as attached to the machine is rotated at a predetermined rotational speed, to match the winding estimated temperature rise profile with the winding actual temperature rise profile, and corrects the temperature rise estimation arithmetic expression using the correction coefficient.

The present invention in its second aspect provides the motor control device according to the above-described first aspect, wherein the correction unit corrects the temperature rise estimation arithmetic expression in consideration of the amount of drop in temperature due to a cooling factor upon the operation of the machine.

The present invention in its third aspect provides the motor control device according to the above-described first or second aspect, wherein the winding temperature estimation unit estimates the temperature of the winding using an ON time and a current value of the motor corresponding to one-cycle operation of the machine.

The present invention in its fourth aspect provides the motor control device according to the above-described third aspect, further including an allowable duty cycle time calculation unit which calculates an allowable duty cycle time for the machine, which keeps the temperature of the winding estimated by the winding temperature estimation unit below a temperature protection level for the motor, based on the estimated temperature of the winding.

The present invention in its fifth aspect provides a method for calculating an allowable duty cycle time for a machine, which is executed by a motor control device. The device includes a winding temperature estimation unit which estimates a winding temperature based on a temperature rise estimation arithmetic expression for calculating the temperature of a winding of a motor, which actuates the machine, using a current value applied to the winding, and a temperature sensor mounted on the winding. The method includes: calculating a correction coefficient for correcting the temperature of the winding, based on the result of a comparison between a winding estimated temperature rise profile representing the temperature of the winding estimated by the winding temperature estimation unit and a winding actual temperature rise profile representing the temperature of the winding measured by the temperature sensor, when the motor as attached to the machine is rotated at a predetermined rotational speed, to match the winding estimated temperature rise profile with the winding actual temperature rise profile, and correcting the temperature rise estimation arithmetic expression using the correction coefficient; estimating the temperature of the winding based on an ON time and a current value of the motor corresponding to one-cycle operation of the machine, by the winding temperature estimation unit using the temperature rise estimation arithmetic expression having the correction coefficient corrected; and calculating an allowable duty cycle time for the machine, which keeps the estimated temperature of the winding below a temperature protection level for the motor.

These and other objects, features, and advantages of the present invention will become more apparent from a detailed description of a typical embodiment of the present invention which is illustrated in the accompanying drawings.

DETAILED DESCRIPTION

An embodiment of the present invention will be described below with reference to the drawings. In the following drawings, the same reference numerals denote the same members. To foster a better understanding, these drawings use different scales as appropriate. Modes illustrated in the drawings are merely examples for carrying out the present invention, and the present invention is not limited to the illustrated modes.

Figure 1:
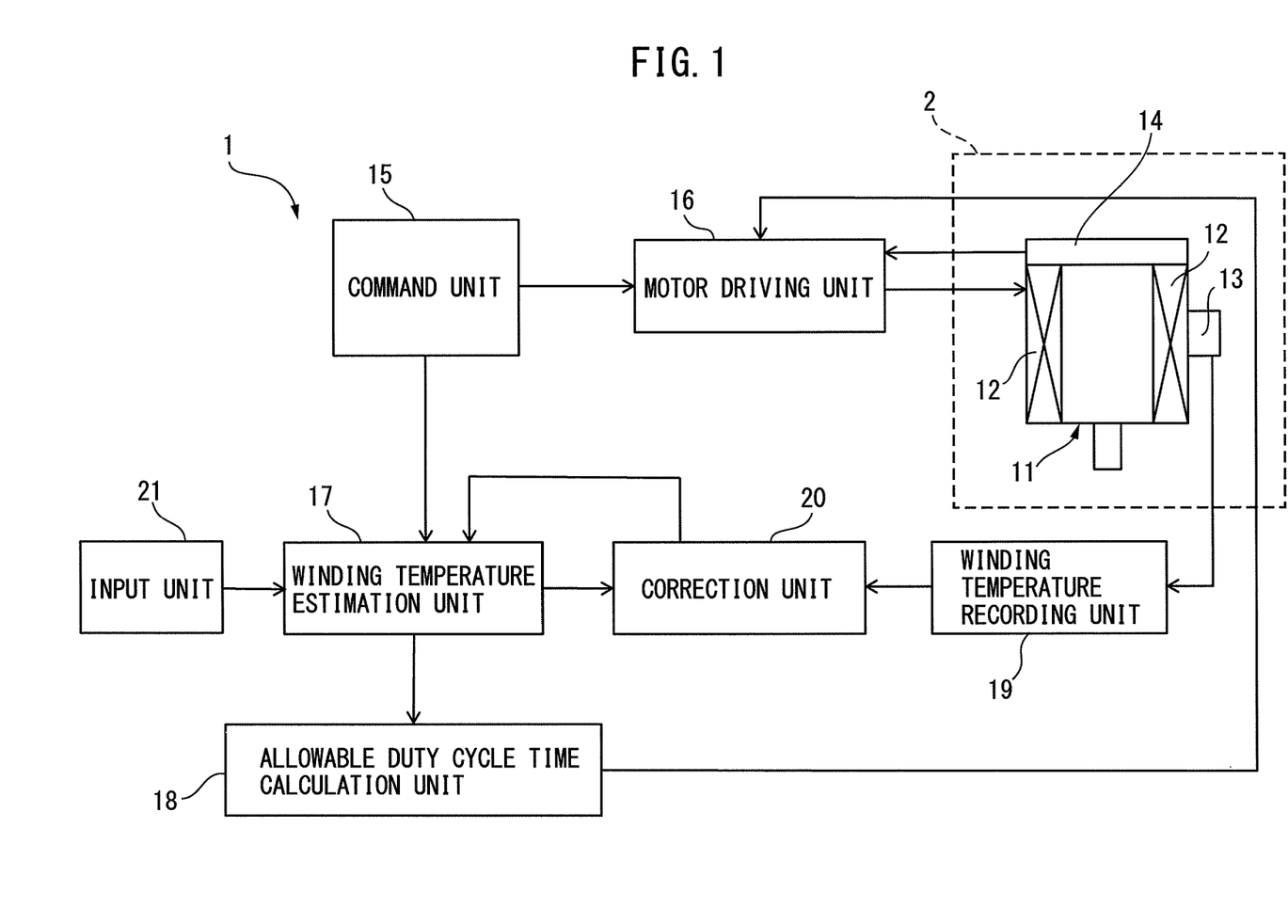
FIG. 1 is a block diagram illustrating the configuration of a motor control device according to an embodiment of the present invention.

FIG. 1 is a block diagram illustrating the configuration of a motor control device according to an embodiment of the present invention.

A motor control device 1 illustrated as FIG. 1 has a function for switching control between the motor ON time and the motor OFF time to prevent burnout of windings 12 of a motor 11 which actuates a machine 2 such as a robot or a machine tool (neither is illustrated). In particular, as described in "Background of the Invention," the motor control device 1 estimates the temperature of the windings 12 in one-cycle operation of a machine and drives the motor 11 in accordance with a combination (i.e., the allowable duty cycle time) of the motor ON time and the motor OFF time, which keeps the temperature of the windings 12 below an alarm level (i.e., the motor temperature protection level) upon repetitions of one-cycle operation of the machine. Note that the heat capacity varies in each individual structure forming the machine 2 equipped with the motor 11. Therefore, to prevent burnout of the windings 12, it is effective to accurately estimate the temperature of the windings 12 in consideration of the heat capacity of the machine 2.

The motor control device 1 according to this embodiment includes a temperature sensor 13, an encoder 14, a command unit 15, and a motor driving unit 16, as depicted as FIG. 1. The temperature sensor 13 is mounted on the motor 11 and detects the temperature of the windings 12. The encoder 14 detects the rotational position and rotational speed of the motor 11. The command unit 15 generates and outputs predetermined operation commands for driving the motor 11, such as speed and torque commands. The motor driving unit 16 drives the motor 11 based on the value detected by the encoder 14 and the command value issued by the command unit 15.

The motor control device 1 according to this embodiment further includes a winding temperature estimation unit 17, an allowable duty cycle time calculation unit 18, and a winding temperature recording unit 19. The winding temperature estimation unit 17 estimates the temperature of the windings 12 of the motor 11 using a temperature rise estimation arithmetic expression stored in advance. The allowable duty cycle time calculation unit 18 calculates an allowable duty cycle time for the machine based on the winding temperature estimated by the winding temperature estimation unit 17 and outputs it to the motor driving unit 16. The winding temperature recording unit 19 sequentially records the temperatures of the windings 12, detected by the temperature sensor 13, every predetermined time. The motor control device 1 further includes a correction unit 20 which calculates a correction coefficient for the temperature rise estimation arithmetic expression in the winding temperature estimation unit 17 with a comparison between a winding actual temperature rise profile obtained from actual temperatures sequentially recorded by the winding temperature recording unit 19 and a winding estimated temperature rise profile obtained from temperatures sequentially estimated by the winding temperature estimation unit 17, and corrects the temperature rise estimation arithmetic expression using the correction coefficient. The winding temperature estimation unit 17 is preferably connected to an input unit 21 capable of receiving parameters for the temperature rise estimation arithmetic expression.

The winding temperature estimation unit 17 illustrated as FIG. 1 stores and holds a temperature rise estimation arithmetic expression for estimating a rise in temperature of the windings 12, as given by, e.g.:

[Rise in Temperature of Motor Windings]=[Rise in Temperature at Time of Continuous Rating]× [(Motor Current)^2]/[(Current at Time of Continuous Rating)^2]×(1−$e^{\wedge}$(−[Elapsed Time]/ [Thermal Time Constant]))   (1)

which is used by the winding temperature estimation unit 17 to estimate a temperature rise profile for the windings 12.

In above-mentioned expression (1), the "current at the time of continuous rating" represents the maximum current value that can be continuously applied to the windings 12 without overheating the motor 11, and the "rise in temperature at the time of continuous rating" represents the amount of rise in temperature in the period from the start of actual supply of a current at the time of continuous rating in the motor alone until the temperature of the windings 12 saturates. The "elapsed time" represents the period of time passing from the start of current supply to the windings 12 to the end of current supply, i.e., the motor ON time. The "thermal time constant" represents the time taken for a change in temperature of the windings 12. The "motor current" represents the current value when the motor 11 is operated in accordance with commands. As a matter of course, the "current at the time of continuous rating," the "rise in temperature at the time of continuous rating," and the "thermal time constant" are determined in the design and manufacturing stages of the motor 11 and are therefore given to expression (1) from the beginning. The "motor current" and the "elapsed time" are parameters in above-mentioned expression (1). The "motor current" and the "elapsed time" can be input from the command unit 15 or the input unit 21 to the winding temperature estimation unit 17.

In the present application, based on, e.g., a track record for actual processing by a machine tool or simulation that uses analysis of a processing program, a motor current corresponding to one-cycle operation of the machine can be obtained in advance and input from the input unit 21 to the winding temperature estimation unit 17.

First Exemplary Method

Figure 2:
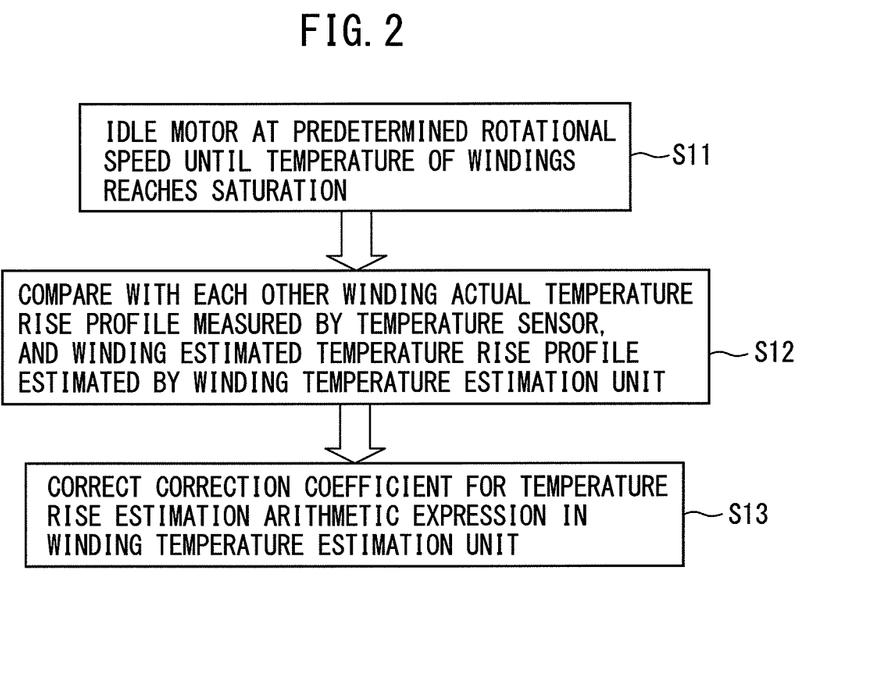
FIG. 2 is a flowchart illustrating a first exemplary method according to the present invention.

A first exemplary method for estimating a temperature rise profile for the windings 12 in consideration of the heat capacity of the machine 2 in the motor control device 1 illustrated as FIG. 1 will be described below. FIG. 2 is a flowchart illustrating a first exemplary method according to the present invention.

First, the operator of the machine 2 attaches the motor 11 to the machine 2. At this time, any object has not yet been connected to the rotating shaft of the motor 11. In this state, the command unit 15 (FIG. 1) outputs a speed command to the motor driving unit 16 so that the motor 11 rotates at a predetermined rotational speed. The motor driving unit 16 (FIG. 1) idles the motor 11 at a predetermined rotational speed while referring to the value detected by the encoder 14 (step S11 in FIG. 2). The "predetermined rotational speed" is desirably equal to, but may be lower than a maximum rotational speed.

The winding temperature recording unit 19 (FIG. 1) generates a winding actual temperature rise profile by sequentially recording the temperatures of the windings 12, detected by the temperature sensor 13, every predetermined time until the temperature of the windings 12 reaches at least a saturation temperature. On the other hand, the winding temperature estimation unit 17 (FIG. 1) generates a winding estimated temperature rise profile by sequentially estimating the temperatures of the windings 12 of the motor 11 when the motor 11 is rotated at a predetermined rotational speed, every predetermined time based on the temperature rise estimation arithmetic expression presented in above-mentioned expression (1). Parameters (i.e., the "motor current" and the "elapsed time") preferably defined in expression (1) for the estimation are input from the command unit 15 and the input unit 21 to the winding temperature estimation unit 17. For example, as the "motor current" presented in expression (1), a command current value generated when the motor 11 is rotated at a predetermined rotational speed is input from the command unit 15 to the winding temperature estimation unit 17. The time from the start of temperature measurement of the windings 12 by the temperature sensor 13 until the temperature of the windings 12 reaches a saturation temperature corresponds to the "elapsed time" in expression (1).

The correction unit 20 (FIG. 1) compares the winding actual temperature rise profile obtained by the winding temperature recording unit 19 and the winding estimated temperature rise profile obtained by the winding temperature estimation unit 17 with each other (step S12 in FIG. 2).

Figure 3:
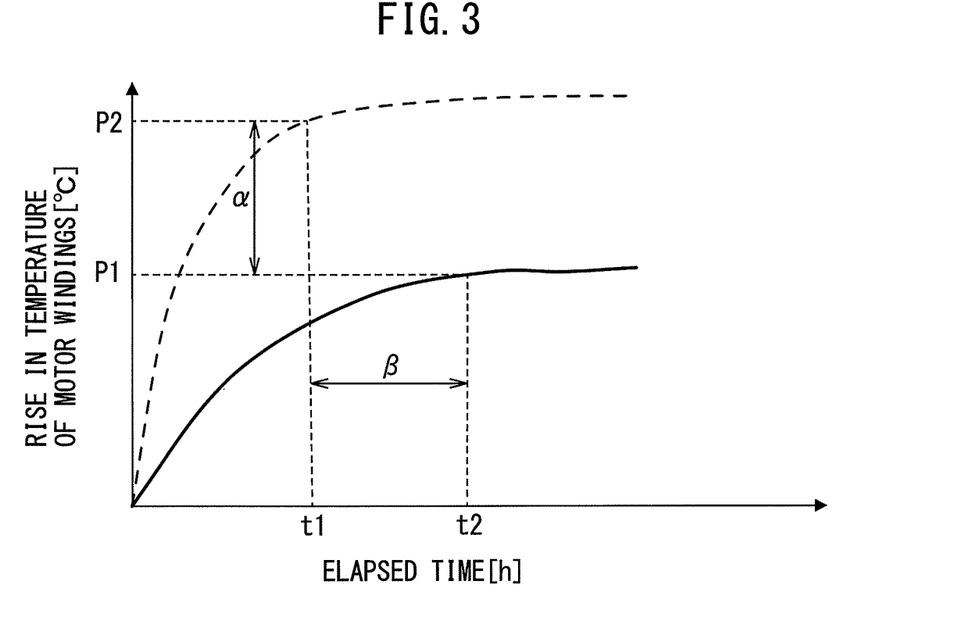
FIG. 3 is a graph for explaining details of step S12 illustrated as FIG. 2 and representing a winding actual temperature rise profile and a winding estimated temperature rise profile.

Step S12 will be described in more detail below. FIG. 3 is a graph for explaining details of step S12 and representing a winding actual temperature rise profile (a graph indicated by a solid line in FIG. 3) and a winding estimated temperature rise profile (a graph indicated by a broken line in FIG. 3). Referring to FIG. 3, the abscissa represents an elapsed time (h) after the start of current supply to the windings, and the ordinate represents the motor winding temperature (° C.).

As can be seen from the graph illustrated as FIG. 3, a saturation temperature P1 of the windings 12 in the winding actual temperature rise profile is lower than a saturation temperature P2 of the windings 12 in the winding estimated temperature rise profile by $\alpha$ [° C.]. Time t2 at which the windings 12 reach the saturation temperature P1 in the winding actual temperature rise profile is later than time t1 at which the windings 12 reach the saturation temperature P2 in the winding estimated temperature rise profile by $\beta$ [h]. In the first exemplary method according to the present invention, the winding estimated temperature rise profile (a graph indicated by a broken line in FIG. 3) is matched with the winding actual temperature rise profile (a graph indicated by a solid line in FIG. 3). In doing this, the above-mentioned correction unit 20 first compares the winding actual temperature rise profile, as illustrated as FIG. 3, and the winding estimated temperature rise profile obtained using expression (1) with each other to obtain the values of above-mentioned $\alpha$ and $\beta$.

Making an allowance for above-described $\alpha$ and $\beta$ in expression (1) and introducing, into expression (1), correction coefficient 1 which makes the estimated winding temperature equal to an actual winding temperature yields:

[Rise in Temperature of Motor Windings]−$\alpha$=[(Rise in Temperature at Time of Continuous Rating)× (Correction Coefficient 1)]×[(Motor Current)^2/ [(Current at Time of Continuous Rating)^2]×(1− e^(−[Elapsed Time]/[Thermal Time Constant− $\beta$]))     (2)

Such expression (2) is stored and held in the correction unit 20. Values other than $\alpha$ and $\beta$ in expression (2) are already obtained upon generation of a winding estimated temperature rise profile (a graph indicated by a broken line in FIG. 3).

The correction unit 20 inputs the obtained values of $\alpha$ and $\beta$ to the terms $\alpha$ and $\beta$, respectively, in expression (2) and calculates correction coefficient 1 in expression (2) to make the left- and right-hand sides of expression (2) equal. The correction unit 20 corrects the temperature rise estimation arithmetic expression (above-mentioned expression (1)) in the winding temperature estimation unit 17, using correction coefficient 1 calculated to match the winding estimated temperature rise profile with the winding actual temperature rise profile (step S13 in FIG. 2). The corrected temperature rise estimation arithmetic expression is given by multiplying the right-hand side of above-mentioned expression (1) by correction coefficient 1, as per:

[Rise in Temperature of Motor Windings]=[(Rise in Temperature at Time of Continuous Rating)× (Correction Coefficient 1)]×[(Motor Current)^2/

$$[\text{(Current at Time of Continuous Rating)}^2] \times (1 - e^{\wedge}(-[\text{Elapsed Time}]/[\text{Thermal Time Constant}])) \quad (3)$$

The winding temperature estimation unit 17 estimates the temperature of the windings 12 using the corrected temperature rise estimation arithmetic expression (above-mentioned expression (3)).

As described above, in the first exemplary method, first, a winding actual temperature rise profile obtained from the temperature sensor 13 when the motor 11 as actually attached to the machine 2 is rotated at a predetermined rotational speed, and a winding estimated temperature rise profile estimated by the winding temperature estimation unit 17 when the motor 11 is similarly rotated at a predetermined rotational speed are compared with each other. A correction coefficient for the temperature rise estimation arithmetic expression which can match the winding estimated temperature rise profile with the winding actual temperature rise profile is calculated based on the comparison result. The winding temperature is estimated using the temperature rise estimation arithmetic expression multiplied by the correction coefficient. It is, therefore, possible to accurately estimate the temperature of the windings 12 in consideration of the heat capacity of the machine 2. To put it more precisely, even when the structure of the machine 2 equipped with the motor 11 is changed, the temperature of the windings 12 can be accurately estimated in consideration of the heat capacity of the machine 2, as mentioned above, to allow switching control between the motor ON time and the motor OFF time to prevent burnout of the windings 12 of the motor 11.

Second Exemplary Method

Figure 4:
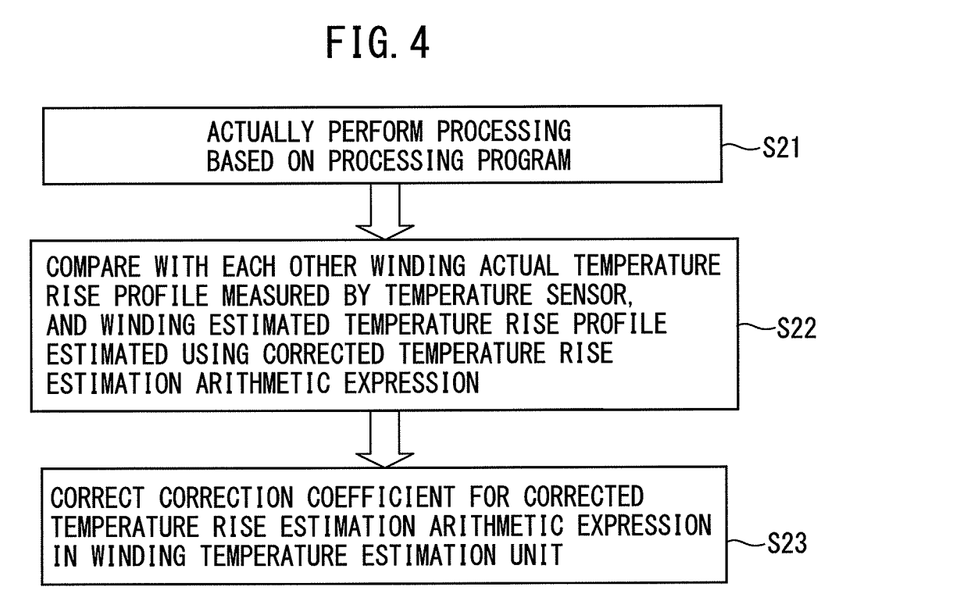
FIG. 4 is a flowchart illustrating a second exemplary method according to the present invention.

A second exemplary method for estimating a temperature rise profile for the windings 12 in consideration of the heat capacity of the machine 2 in the motor control device 1 illustrated as FIG. 1 will be described below. FIG. 4 is a flowchart illustrating a second exemplary method according to the present invention.

In the following second exemplary method, the temperature rise estimation arithmetic expression for the windings 12 is corrected by actual processing based on a processing program to bring the winding estimated temperature rise profile obtained using the above-described first exemplary method closer to the winding actual temperature rise profile.

The operator of the machine attaches the motor 11 to the machine 2, and a processing tool (not illustrated) to the rotating shaft of the motor 11, and fixes a workpiece (not illustrated) to be processed by the processing tool onto an operation table for the machine 2. In such a state, first, the command unit 15 (FIG. 1) outputs a predetermined command to the motor driving unit 16 to drive the motor 11 so that the workpiece is actually processed based on a processing program generated using track programming in advance (step S21 in FIG. 4). At this time, the motor 11 is preferably driven while supplying a coolant such as a cutting fluid to the processing tool and the workpiece.

The winding temperature recording unit 19 (FIG. 1) generates a winding actual temperature rise profile again by sequentially recording the temperatures of the windings 12, detected by the temperature sensor 13, every predetermined time until the end of the processing program (i.e., one-cycle operation of the machine). The correction unit 20 (FIG. 1) compares with each other the winding actual temperature rise profile obtained when the workpiece is processed based on the processing program, and the winding estimated temperature rise profile estimated using the temperature rise estimation arithmetic expression (above-mentioned expression (3)) corrected through steps S11 to S13 (see FIG. 2) in the above-mentioned first exemplary method (step S22 in FIG. 4).

Figure 5:
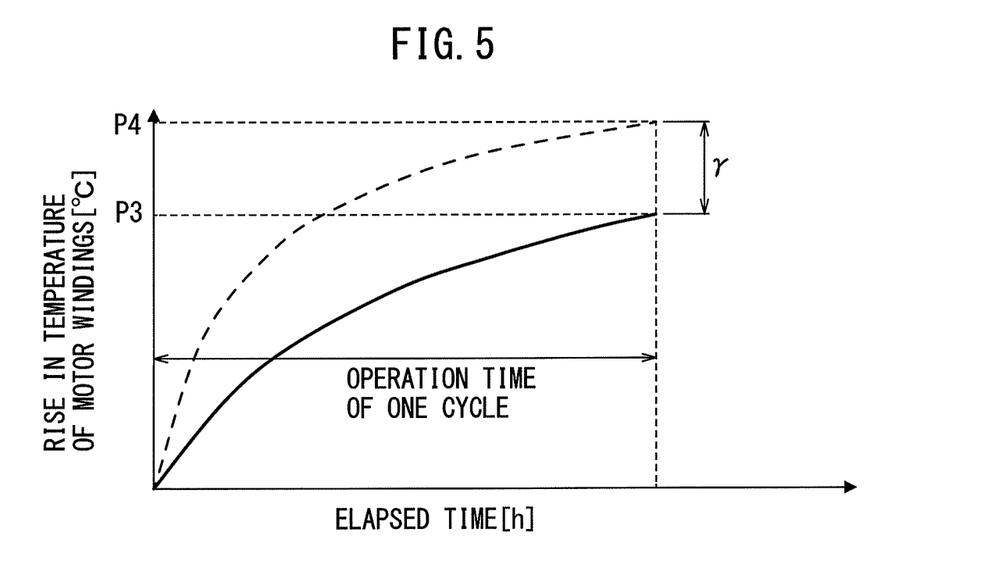
FIG. 5 is a graph for explaining details of step S22 illustrated as FIG. 4 and representing another winding actual temperature rise profile and another winding estimated temperature rise profile.

Step S22 will be described in more detail below. FIG. 5 is a graph for explaining details of step S22 and representing a winding actual temperature rise profile (a graph indicated by a solid line in FIG. 5) and a winding estimated temperature rise profile (a graph indicated by a broken line in FIG. 5). Referring to FIG. 5, the abscissa represents an elapsed time (h) after the start of current supply to the windings, and the ordinate represents the motor winding temperature (° C.).

As can be seen from the graph illustrated as FIG. 5, in one-cycle operation time of the machine (i.e., in one cycle of the processing program), a maximum temperature P3 of the winding actual temperature rise profile is lower by γ [° C.] than a maximum temperature P4 of the winding estimated temperature rise profile estimated using the corrected temperature rise estimation arithmetic expression. In the second exemplary method of the present invention, the winding estimated temperature rise profile (a graph indicated by a broken line in FIG. 5) is matched with the winding actual temperature rise profile (a graph indicated by a solid line in FIG. 5). In doing this, the above-mentioned correction unit 20 first compares the winding actual temperature rise profile, as illustrated as FIG. 5, and the winding estimated temperature rise profile obtained using above-mentioned expression (3) with each other to obtain the value of above-mentioned γ.

Making an allowance for above-described γ in above-mentioned expression (3) and introducing, into expression (3), correction coefficient 2 which makes the winding temperature estimated using expression (3) equal to an actual winding temperature yields:

$$[\text{Rise in Temperature of Motor Windings}] - \gamma = [(\text{Rise in Temperature at Time of Continuous Rating}) \times (\text{Correction Coefficient 1}) \times (\text{Correction Coefficient 2})] \times [(\text{Motor Current})^2] / [(\text{Current at Time of Continuous Rating})^2] \times (1 - e^{\wedge}(-[\text{Elapsed Time}]/[\text{Thermal Time Constant}])) \quad (4)$$

Such expression (4) is stored and held in the correction unit 20 as well. Values other than γ and correction coefficient 2 in expression (4) are already given to the correction unit 20 in the processes of steps S11 to S13 in the above-mentioned first exemplary method.

The correction unit 20 inputs the obtained value of γ to the term γ in expression (4) and calculates correction coefficient 2 in expression (4) to make the left- and right-hand sides of expression (4) equal. The correction unit 20 corrects the temperature rise estimation arithmetic expression (above-mentioned expression (1)) in the winding temperature estimation unit 17, using correction coefficient 2 calculated to match the winding estimated temperature rise profile estimated using above-mentioned expression (3) with the winding actual temperature rise profile (step S23 in FIG. 4). In other words, the corrected temperature rise estimation arithmetic expression is given by multiplying the right-hand side of above-mentioned expression (1) by correction coefficients 1 and 2, as per:

$$[\text{Rise in Temperature of Motor Windings}] = [(\text{Rise in Temperature at Time of Continuous Rating}) \times (\text{Correction Coefficient 1}) \times (\text{Correction Coefficient 2})] \times [(\text{Motor Current})^2] / [(\text{Current at Time of Continuous Rating})^2] \times (1 - e^{\wedge}(-[\text{Elapsed Time}]/[\text{Thermal Time Constant}])) \quad (5)$$

The winding temperature estimation unit 17 estimates the temperature of the windings 12 using the corrected temperature rise estimation arithmetic expression (above-mentioned expression (5)).

As described above, in the second exemplary method, the temperature rise estimation arithmetic expression is corrected in consideration of drops in temperature of the motor 11 and the windings 12 due to factors associated with, e.g., a coolant, a workpiece (an object to be processed), and a processing tool upon the operation of the machine. In other words, the correction unit 20 corrects the temperature rise estimation arithmetic expression in consideration of the amount of drop in temperature due to cooling factors upon the operation of the machine. It is, therefore, possible to more accurately estimate the temperature of the windings 12 in the second exemplary method than in the above-mentioned first exemplary method.

In the second exemplary method, first, a winding actual temperature rise profile obtained when the workpiece is processed based on the processing program, and a winding estimated temperature rise profile estimated using the temperature rise estimation arithmetic expression (above-mentioned expression (3)) corrected using the above-mentioned first exemplary method are compared with each other. Correction coefficient 2 for the temperature rise estimation arithmetic expression which brings the estimated winding temperature closer to an actual winding temperature is calculated based on the comparison result. However, another method may be applicable to the present invention. In other words, a processing tool (not illustrated) is attached to the rotating shaft of the motor 11, a workpiece (not illustrated) to be processed by the processing tool is fixed onto an operation table for the machine, and a coolant is supplied to the workpiece and the processing tool. In such a state, without processing the workpiece, steps S11 and S12 in the above-mentioned first exemplary method may be sequentially executed to obtain the terms $\alpha$ and $\beta$ of above-mentioned expression (2) to calculate correction coefficient 1 for the temperature rise estimation arithmetic expression.

Third Exemplary Method

A method for calculating an allowable duty cycle time for the machine, used to estimate a temperature rise profile for the windings 12 in consideration of the heat capacity of the machine 2 and calculate a combination (i.e., the allowable duty cycle time) of the motor ON time and the motor OFF time, which keeps the temperature of the windings 12 below an alarm level upon repetitions of one-cycle operation of the machine, in the motor control device 1 illustrated as FIG. 1 will be described below as a third exemplary method.

Figure 6:
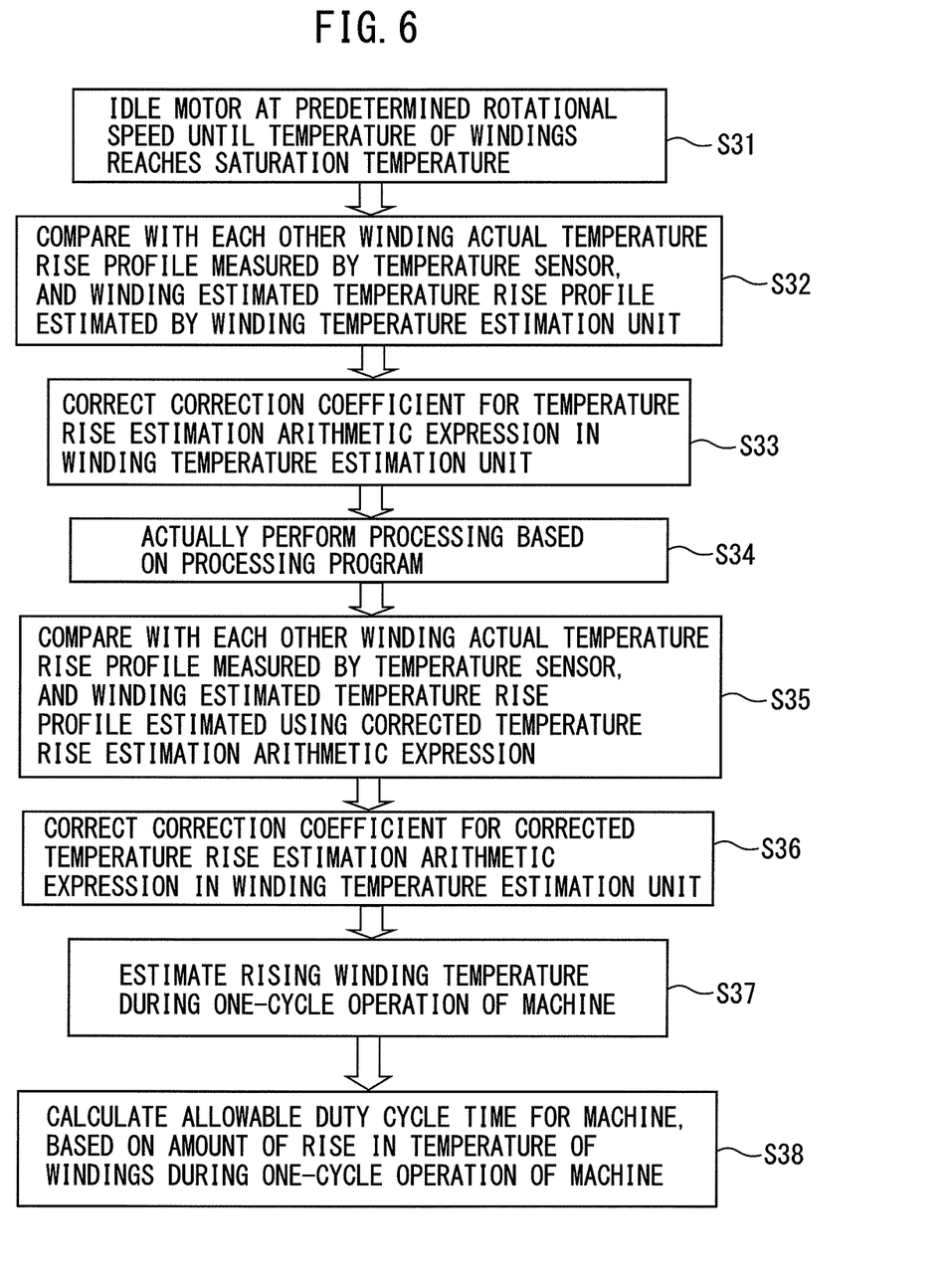
FIG. 6 is a flowchart illustrating a third exemplary method according to the present invention.

FIG. 6 is a flowchart illustrating a third exemplary method according to the present invention. Steps S31 to S33 of steps S31 to S38 illustrated as FIG. 6 are the same as steps S11 to S13 (see FIG. 2) in the above-mentioned first exemplary method, and steps S34 to S36 of steps S31 to S38 are the same as steps S21 to S23 (see FIG. 4) in the above-mentioned second exemplary method. Therefore, only steps S37 and S38 will be described below.

After the end of steps S31 to S36 illustrated as FIG. 6, correction coefficient 1 for above-mentioned expression (2) and correction coefficient 2 for above-mentioned expression (4) are calculated to multiply the right-hand side of above-mentioned expression (1) by correction coefficients 1 and 2 to obtain a temperature rise estimation arithmetic expression (above-mentioned expression (5)). The use of the obtained temperature rise estimation arithmetic expression allows accurate estimation of the temperature of the windings 12 in consideration of the actual processing state of the machine 2.

To calculate an allowable duty cycle time for the machine, which keeps the temperature of the windings 12 below an alarm level upon repetitions of one-cycle operation of the machine, it may be preferable to estimate the temperature of the windings 12 of the motor 11 during one-cycle operation of the machine. This estimation may preferably involve the value of each parameter in the temperature rise estimation arithmetic expression presented in above-mentioned expression (5). The value of each parameter other than the "motor current" and the "elapsed time" in expression (5) is already given from the command unit 15 or the input unit 21 to the winding temperature estimation unit 17.

A motor current value (maximum value) corresponding to one-cycle operation of the machine and an operation time in one cycle of the machine (i.e., a motor ON time) may be preferably obtained. In the third exemplary method of the present invention, the operator of the machine obtains a motor current and a motor ON time corresponding to one-cycle operation of the machine in advance based on, e.g., a track record for actual processing by a machine tool or simulation that uses analysis of a processing program, and inputs the obtained motor current value and motor ON time from the input unit 21 to the winding temperature estimation unit 17. As a matter of course, such a motor current and motor ON time may be obtained based on the processing program by a computer (not illustrated) in the command unit 15 of the motor control device and input from the command unit 15 to the winding temperature estimation unit 17.

When the above-mentioned motor current value and motor ON time are input from the input unit 21 or the command unit 15 to the winding temperature estimation unit 17, the winding temperature estimation unit 17 estimates the temperature of the windings 12 during one-cycle operation of the machine, using the temperature rise estimation arithmetic expression presented in above-mentioned expression (5) (step S37 in FIG. 6).

The allowable duty cycle time calculation unit 18 (FIG. 1) calculates an allowable duty cycle time for the machine, based on the amount of rise in temperature of the windings 12 during one-cycle operation of the machine (step S38 in FIG. 6).

Figure 7:
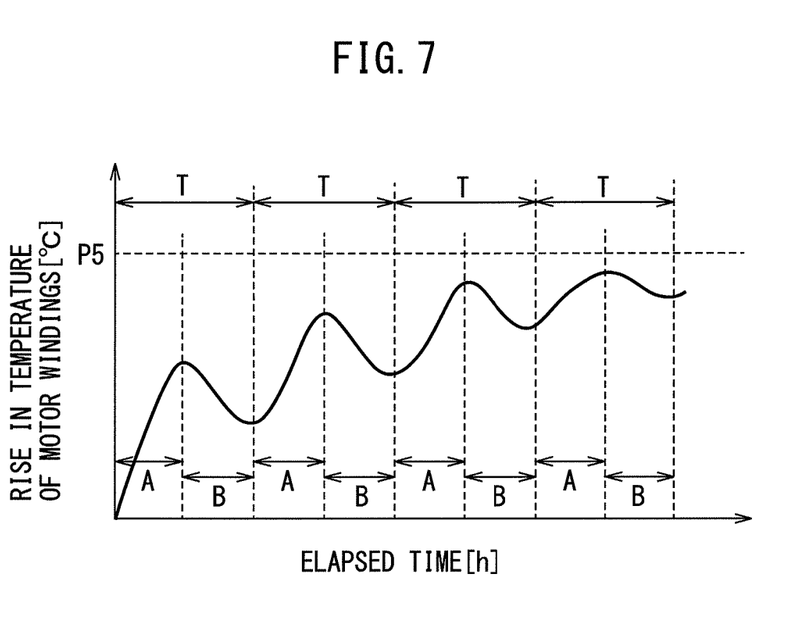
FIG. 7 is a graph for explaining details of step S38 illustrated as FIG. 6 and representing an allowable duty cycle time for a machine, which keeps the winding temperature below an alarm level, and an estimated winding temperature rise profile corresponding to the allowable duty cycle.

Step S38 will be described in more detail below. FIG. 7 is a graph for explaining details of step S38 illustrated as FIG. 6 and representing an allowable duty cycle time (reference symbols T in FIG. 7) for the machine, which keeps the winding temperature below an alarm level, and a winding estimated temperature rise profile (a graph indicated by a solid line in FIG. 7) corresponding to the allowable duty cycle.

As can be seen from the graph illustrated as FIG. 7, the temperature at which the windings 12 do not burn out is preset as an alarm level (predetermined set temperature P5) in a machine tool. A motor OFF time (see reference symbols B in FIG. 7) to be interposed between one-cycle operations (see reference symbols A in FIG. 7) of the machine is obtained to keep the maximum value of the winding temperature estimated in step S37 below the alarm level upon repetitions of one-cycle operation of the machine.

In other words, when a current is continuously supplied to the windings 12 of the motor 11, the windings 12 reach a saturation temperature and suffer overheating and burnout. This means that an alarm level may be preferably set to prevent burnout of the windings 12. When no motor OFF time is set to be after a motor ON time corresponding to one-cycle operation of the machine upon repetitions of one-cycle operation of the machine, a current naturally continues to be supplied to the windings 12 of the motor 11, so the estimated temperature of the windings 12 may exceed the alarm level. On the other hand, when a motor OFF time is set, the time for which no current is supplied to the windings 12 of the motor 11 can be spared so that the temperature of the windings 12 lowers during the motor OFF time. In the present invention, therefore, a shortest motor OFF time to keep the estimated temperature of the windings 12 below the alarm level upon repetitions of one-cycle operation of the machine is obtained. All one-cycle operation times (reference symbols A in FIG. 7) are equal and all motor OFF times (reference symbols B in FIG. 7) are equal as well.

To obtain a shortest motor OFF time, for example, let $\Delta t1$ be the amount of rise in temperature of the windings 12 corresponding to one-cycle operation of the machine, $\Delta t2$ be the amount of drop in temperature of the windings 12 corresponding to the motor OFF time, and N be the number of repetitions of one-cycle operation of the machine. Then, the product of the value obtained by subtracting the amount of drop in temperature $\Delta t2$ of the windings 12 from the amount of rise in temperature $\Delta t1$ of the windings 12, multiplied by the number of repetitions N, is kept below at least the alarm level P5.

In other words, a motor OFF time is obtained to satisfy a condition:

$$P5 > (\Delta t1 - \Delta t2) \times N \quad (6)$$

The amount of rise in temperature $\Delta t1$ of the windings 12 corresponding to one-cycle operation of the machine has been obtained in above-mentioned step S37. As for the number of repetitions N, it suffices to input the number of repetitions N to the allowable duty cycle time calculation unit 18, based on, e.g., the operation program by the operator of the machine. Subtracting a predetermined temperature Tm for the value of the left-hand side of above-mentioned expression (6) yields an estimated value to keep the value of the right-hand side of above-mentioned expression (6) below the alarm level P5. The value of $\Delta t2$ is calculated such that the estimated value is equal to the value of the right-hand side of above-mentioned expression (6). In other words, the value of $\Delta t2$ is calculated by:

$$P5 - Tm = (\Delta t1 - \Delta t2) \times N \quad (7)$$

A motor OFF time is obtained by multiplying the amount of drop in temperature $\Delta t2$ corresponding to the motor OFF time by the thermal time constant of the windings 12.

From the foregoing description, upon obtaining the amount of rise in temperature $\Delta t1$ of the windings 12 in step S37, the allowable duty cycle time calculation unit 18 calculates the amount of drop in temperature $\Delta t2$ of the windings 12 using above-mentioned expression (7). In other words, substituting the values of the amount of rise in temperature $\Delta t1$, the alarm level P5, the predetermined temperature Tm and the number of repetitions N into above-mentioned expression (7) yields an amount of drop in temperature $\Delta t2$. The allowable duty cycle time calculation unit 18 multiplies the calculated amount of drop in temperature $\Delta t2$ by the thermal time constant of the windings 12, obtained in advance, to further calculate the time taken to generate the amount of drop in temperature $\Delta t2$. The thus calculated time is defined as a motor OFF time.

The allowable duty cycle time calculation unit 18 adds the obtained motor OFF time to the motor ON time corresponding to one-cycle operation of the machine to calculate an allowable duty cycle time for the machine. The motor ON time corresponding to one-cycle operation of the machine has already been input from the input unit 21 to the winding temperature estimation unit 17.

As described above, the third exemplary method allows efficient, accurate estimation of the winding temperature in consideration of the heat capacity of the machine and, in turn, yields an accurate allowable duty cycle time for the machine using the estimated value.

In the above-described embodiment, above-mentioned expression (2) or (4) has been taken as an exemplary expression for obtaining a correction coefficient for correcting the temperature rise estimation arithmetic expression (above-mentioned expression (1)) of the windings 12. However, the practice of the present invention is not limited to such arithmetic expressions.

Although a typical embodiment has been described above, the present invention is not limited to the above-described embodiment, which can be changed into, e.g., various forms, structures, and materials without departing from the principle of the present invention.

Advantageous Effects According to Aspects of the Invention

According to the first aspect of the present invention, a correction unit provided in a motor control device compares with each other a winding actual temperature rise profile representing the temperature of windings measured by a temperature sensor when a motor as attached to a machine is rotated at a predetermined rotational speed, and a winding estimated temperature rise profile representing the temperature of the windings estimated by a winding temperature estimation unit in the same state as in the measurement. The correction unit calculates a correction coefficient for a temperature rise estimation arithmetic expression, which matches the winding estimated temperature rise profile with the winding actual temperature rise profile, based on the comparison result. The winding temperature is estimated using the temperature rise estimation arithmetic expression multiplied by the correction coefficient. Since the temperature rise estimation arithmetic expression is corrected as the motor is attached to the machine in this manner, the temperature of the windings can be accurately estimated in consideration of the heat capacity of the machine.

According to the second aspect of the present invention, correcting the temperature rise estimation arithmetic expression in consideration of the amount of drop in temperature due to cooling factors upon the operation of the machine makes it possible to bring the temperature of the windings estimated by the winding temperature estimation unit closer to an actual winding temperature in the machine than in the above-described first aspect.

According to the third to fifth aspects of the present invention, when, for example, one-cycle operation of the machine is repeated in actual processing by a processing machine, the temperature of the windings can be efficiently, accurately estimated to obtain an estimated value, which, in turn, yields an accurate allowable duty cycle time for the machine (i.e., a combination of the motor ON time for one-cycle operation of the machine and the subsequent motor OFF time) to prevent overheating and burnout of the windings.

The invention claimed is:

1. A motor control device for controlling a motor which actuates a machine, the device comprising:

a winding temperature estimation unit configured to calculate an estimated temperature of a winding of the motor in accordance with a temperature rise arithmetic expression for calculating the temperature of the winding using a current value applied to the winding;

a temperature sensor mounted on the winding; and a correction unit configured to:
- compare a winding estimated temperature rise profile representing the temperature of the winding calculated by the winding temperature estimation unit and a winding actual temperature rise profile representing the temperature of the winding measured by the temperature sensor;
- calculate correction coefficients based on the comparison;
- match the winding estimated temperature rise profile with the winding actual temperature rise profile when the motor as attached to the machine is rotated at a predetermined rotational speed;
- update the temperature rise estimation arithmetic expression using the correction coefficient; and
- switch the motor driving unit between motor ON time and motor OFF time according to the winding estimated temperature rise profile, thereby preventing burnout of the winding of the motor.

2. The motor control device according to claim 1, wherein the correction unit corrects the temperature rise estimation arithmetic expression in consideration of an amount of drop in temperature due to a cooling factor upon the operation of the machine.

3. The motor control device according to claim 1, wherein the winding temperature estimation unit estimates the temperature of the winding using an ON time and a current value of the motor corresponding to one-cycle operation of the machine.

4. The motor control device according to claim 3, further comprising: an allowable duty cycle time calculation unit configured to calculate an allowable duty cycle time for the machine, which keeps the temperature of the winding estimated by the winding temperature estimation unit below a temperature protection level for the motor, based on the estimated temperature of the winding.

5. A method for calculating an allowable duty cycle time for a machine, which is executed by a motor control device comprising: a winding temperature estimation unit configured to estimate a winding temperature based on a temperature rise estimation arithmetic expression for calculating a temperature of a winding of a motor, which actuates the machine, using a current value applied to the winding; and a temperature sensor mounted on the winding, the method comprising:
- calculating correction coefficients for correcting the temperature of the winding, based on a result of a comparison between a winding estimated temperature rise profile representing the temperature of the winding estimated by the winding temperature estimation unit and a winding actual temperature rise profile representing the temperature of the winding measured by the temperature sensor, when the motor as attached to the machine is rotated at a predetermined rotational speed, to match the winding estimated temperature rise profile with the winding actual temperature rise profile, and correcting the temperature rise estimation arithmetic expression using the correction coefficient;
- estimating the temperature of the winding based on an ON time and a current value of the motor corresponding to one-cycle operation of the machine, by the winding temperature estimation unit using the temperature rise estimation arithmetic expression having the correction coefficient corrected;
- calculating an allowable duty cycle time for the machine, which keeps the estimated temperature of the winding below a temperature protection level for the motor; and
- switching control of motor ON time and motor OFF time based on the calculated allowable duty cycle time for the machine, thereby preventing burnout of the winding of the motor.

\* \* \* \* \*